(12) United States Patent
Watanabe (10) Patent No.: US 11,142,198 B2
(45) Date of Patent: Oct. 12, 2021

(54) LANE KEEP CONTROL APPARATUS

(71) Applicant: SUBARU CORPORATION, Tokyo (JP)

(72) Inventor: Akihiro Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 221 days.

(21) Appl. No.: 16/433,783

(22) Filed: Jun. 6, 2019

(65) Prior Publication Data
US 2020/0070826 A1 Mar. 5, 2020

(30) Foreign Application Priority Data

Aug. 28, 2018 (JP) .............................. JP2018-159360

(51) Int. Cl.
*B60W 30/12* (2020.01)
*G06K 9/00* (2006.01)
*G08G 1/16* (2006.01)

(52) U.S. Cl.
CPC ......... *B60W 30/12* (2013.01); *G06K 9/00798* (2013.01); *G06K 9/00825* (2013.01);
(Continued)

(58) Field of Classification Search
CPC .......... G06K 9/00798; G06K 9/00825; B60W 30/12; B60W 2552/53; B60W 2554/4045;
(Continued)

(56) References Cited

U.S. PATENT DOCUMENTS

2009/0157286 A1* 6/2009 Saito ..................... B60W 30/16
701/117
2012/0226392 A1 9/2012 Kataoka
(Continued)

FOREIGN PATENT DOCUMENTS

| JP | 2007-164636 A | 6/2007 |
| JP | 2016-172531 A | 9/2016 |

(Continued)

OTHER PUBLICATIONS

Japanese Notification of Reasons for Refusal issued in corresponding Japanese Patent Application No. 2018-159360, dated Jan. 28, 2020, with English translation.

*Primary Examiner* — Kenneth J Malkowski
(74) *Attorney, Agent, or Firm* — McDermott Will & Emery LLP (57) ABSTRACT

A lane keep control apparatus includes a first calculator. The first calculator includes a first determiner, a second determiner, a third determiner, and a second calculator. The first determiner is configured to determine whether a preceding vehicle travels on a traveling lane of an own vehicle. The second determiner is configured to determine whether a blinker of the preceding vehicle blinks. The third determiner is configured to determine whether widening of one or both of lane lines is present. The second calculator is configured to set, on a condition that the blinker of the preceding vehicle is determined as blinking and the widening is determined as being present, a target traveling course on the basis of one of the lane lines positioned on opposite side of the other of the lane lines that is positioned on a side on which the blinker of the preceding vehicle is determined as blinking.

4 Claims, 7 Drawing Sheets

(52) U.S. Cl.
CPC ............. *G08G 1/166* (2013.01); *G08G 1/167* (2013.01); *G06T 2207/30256* (2013.01)

(58) Field of Classification Search
CPC ...... B60W 40/00; B60W 10/20; B60W 10/18; B60W 2710/20; B60W 2710/18; B60W 2720/10; B60T 8/17557; B60T 2201/08; G06T 2207/30256; G08G 1/167; G08G 1/166

See application file for complete search history.

(56) References Cited

U.S. PATENT DOCUMENTS

| | | | | |
|---|---|---|---|---|
| 2013/0226402 | A1* | 8/2013 | Tsuruta | G08G 1/166 701/36 |
| 2016/0272203 | A1* | 9/2016 | Otake | B60W 50/14 |
| 2017/0225686 | A1* | 8/2017 | Takaso | B60W 30/12 |

FOREIGN PATENT DOCUMENTS

| | | |
|---|---|---|
| JP | 2017-137001 A | 8/2017 |
| WO | 2011/064825 A1 | 6/2011 |

\* cited by examiner

LANE KEEP CONTROL APPARATUS

CROSS-REFERENCE TO RELATED APPLICATIONS

The present application claims priority from Japanese Patent Application No. 2018-159360 filed on Aug. 28, 2018, the entire contents of which are hereby incorporated by reference.

BACKGROUND

The technology relates to a lane keep control apparatus that sets a target traveling course.

A vehicle, or an own vehicle, driven by a driver is often mounted with a car navigation system. When the driver sets a destination, the car navigation system detects a position of the own vehicle on the basis of position information received from positioning satellites, such as global navigation satellite system (GNSS) satellites as typified by global positioning system (GPS) satellites. Thereafter, the car navigation system matches the detected own vehicle position with road map information, thereby setting a running route from the own vehicle position to the destination and thus guiding the own vehicle to the destination along the running route.

An active lane keep (ALK) control is known that reduces a burden to be imposed on the driver. For example, to reduce the driver's burden, the active lane keep control causes a vehicle to assist steering to be performed by the driver when the own vehicle travels straight a freeway or a general road. The active lane keep control acquires information on a traveling environment ahead of the own vehicle by means of a sensing device, such as a camera, mounted on the own vehicle. Further, on the basis of the thus-acquired traveling environment information, the active lane keep control recognizes lane lines, such as white lines or other colored lines, that define right and left of a lane (or a "traveling lane") along which the own vehicle travels. Thereafter, the active lane keep control determines a lane width from a distance between the right and left lane lines, and sets a target traveling course on the basis of the determined lane width. The target traveling course is used to cause the own vehicle to travel in the middle of the traveling lane.

The active lane keep control, however, can fail to detect a lane line in an example case in which a branch road is present ahead of the traveling lane and the lane line is discontinued due to the branch road. Such an example case makes it difficult for the active lane keep control to set the target traveling course and can result in cancellation of the active lane keep control.

To address the difficulties in setting the target traveling course in such an example case, International Publication No. WO2011/064825 discloses a technique that sets a virtual lane line by extending a lane line obtained thus far, when one of the right and the left lane lines is discontinued. The technique disclosed in WO2011/064825 determines the lane width on the basis of the virtual lane line and the actually-detected lane line positioned on the opposite side of the virtual lane line, and thereby allows for setting of the target traveling course.

SUMMARY

An aspect of the technology provides a lane keep control apparatus that includes: an acquiring unit configured to acquire traveling environment information that represents a traveling environment ahead of an own vehicle; a first extractor configured to extract preceding vehicle information from the traveling environment information acquired by the acquiring unit, in which the preceding vehicle information is information on a preceding vehicle that travels ahead of the own vehicle; a second extractor configured to extract lane line information from the traveling environment information acquired by the acquiring unit, in which the lane line information is information on a pair of lane lines that define right and left of a traveling lane along which the own vehicle travels; and a first calculator configured to determine a lane width of the traveling lane on a basis of the lane line information extracted by the second extractor, and calculate a target traveling course, in which the target traveling course is configured to cause the own vehicle to travel along a predetermined lateral position in the lane width. The first calculator includes a first determiner configured to determine whether the preceding vehicle travels on the traveling lane, on a basis of the preceding vehicle information extracted by the first extractor, a second determiner configured to determine, when the first determiner determines that the preceding vehicle travels on the traveling lane, whether a blinker of the preceding vehicle blinks, on a basis of the traveling environment information acquired by the acquiring unit, a third determiner configured to determine whether widening of one or both of the lane lines is present, in which the widening is a situation in which the one or both of the lane lines extends in a direction in which the lane width becomes wider, and a second calculator configured to set, on a condition that the blinker of the preceding vehicle is determined by the second determiner as blinking and that the widening is determined by the third determiner as being present, the target traveling course on a basis of, as a reference, one of the lane lines that is positioned on opposite side of the other of the lane lines, in which the other of the lane lines is positioned on a side on which the blinker of the preceding vehicle is determined by the second determiner as blinking.

An aspect of the technology provides a lane keep control apparatus that includes: a detector configured to detect a traveling environment ahead of an own vehicle and acquire traveling environment information that represents the traveling environment; and circuitry configured to extract preceding vehicle information from the traveling environment information acquired by the detector, in which the preceding vehicle information is information on a preceding vehicle that travels ahead of the own vehicle, extract lane line information from the traveling environment information acquired by the detector, in which the lane line information is information on a pair of lane lines that define right and left of a traveling lane along which the own vehicle travels, determine a lane width of the traveling lane on a basis of the extracted lane line information, calculate a target traveling course that is configured to cause the own vehicle to travel along a predetermined lateral position in the lane width, determine whether the preceding vehicle travels on the traveling lane, on a basis of the extracted preceding vehicle information, determine, when the preceding vehicle is determined as traveling on the traveling lane, whether a blinker of the preceding vehicle blinks, on a basis of the traveling environment information acquired by the detector, determine whether widening of one or both of the lane lines is present, in which the widening is a situation in which the one or both of the lane lines extends in a direction in which the lane width becomes wider, and set, on a condition that the blinker of the preceding vehicle is determined as blinking and that the widening is determined as being present, the target traveling course on a basis of, as a reference, one of the lane lines that is positioned on opposite side of the other of the lane lines, in which the other of the lane lines being positioned on a side on which the blinker of the preceding vehicle is determined as blinking.

DETAILED DESCRIPTION

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 9:
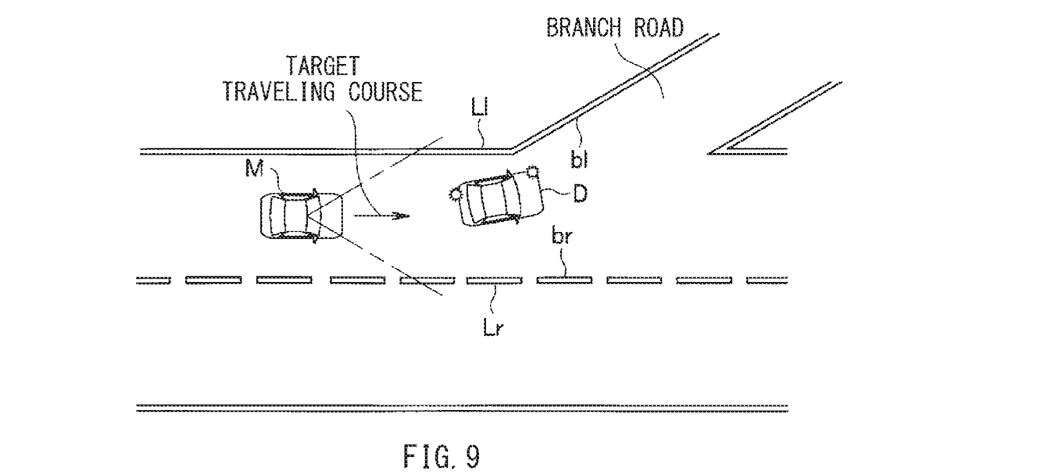
FIG. 9 is an explanatory diagram illustrating a state in which the preceding vehicle attempts to make the course change toward the branch road by blinking a blinker of the preceding vehicle.
Figure 10:
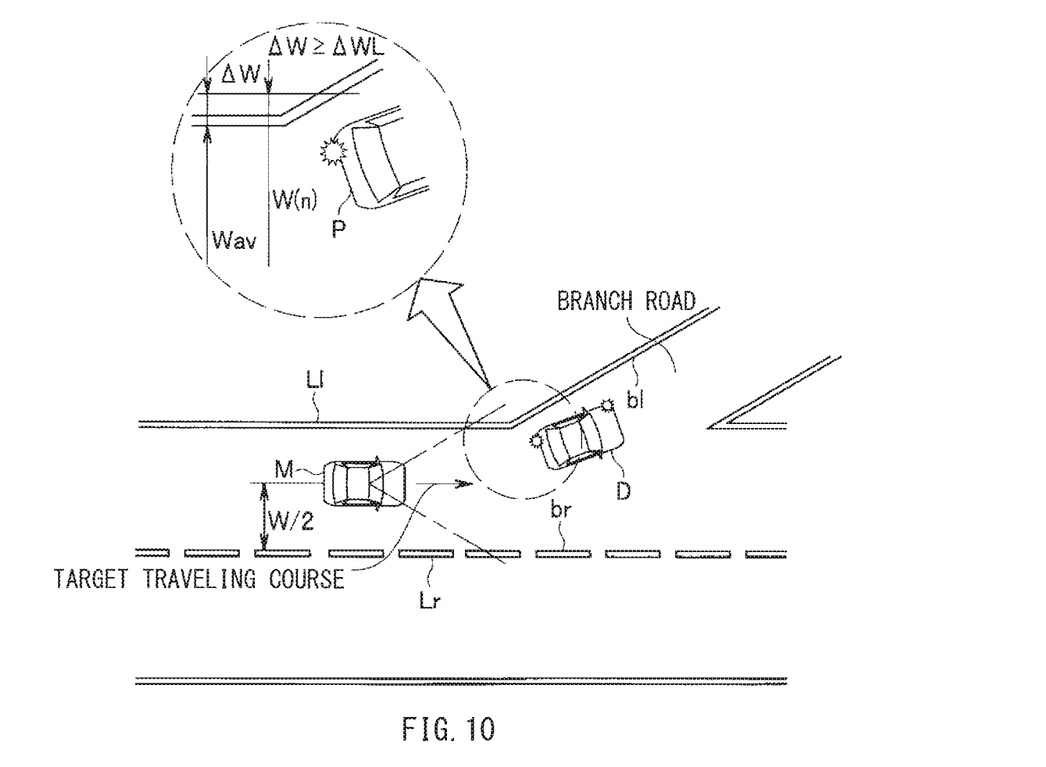
FIG. 10 is an explanatory diagram illustrating a state in which an own vehicle has recognized a lane line positioned on the branch-road side.

FIG. 9 illustrates an example of a state in which a preceding vehicle attempts to make a course change toward a branch road by blinking a blinker of the preceding vehicle. FIG. 10 illustrates a state in which an own vehicle has recognized a lane line positioned on the branch-road side. Referring to FIG. 9, a left lane line extends along the branch road in an example case in which the branch road is present on the left side of a lane. In this example case, a lane width is set on the basis of a distance between the lane line positioned on the branch-road side and a right lane line.

Accordingly, a technique disclosed in WO2011/064825 involves a slight delay until detecting a discontinuation of a lane line. During the delay period, the lane width increases in accordance with the lane line positioned on the branch-road side by an increment of ΔW, and thus the lane width is so detected that the lane width widens gradually. This causes the target traveling course to be set in a biased fashion toward the branch-road side and thus the own vehicle travels unstably, making a driver feel a sense of discomfort.

To address the delay in detecting the discontinuation of the lane line, one possible measure may be to detect a widening of the lane lines promptly to suppress the unstable traveling of the own vehicle. However, the distance between the right and the left lane lines can have an error, which allows a slight increase in the distance between the lane lines to be determined erroneously as being the discontinuation of any lane line. Such an erroneous determination makes it difficult to obtain a stable lane keep controllability and makes the driver feel the sense of discomfort even more.

It is desirable to provide a lane keep control apparatus that makes it possible to reduce a sense of discomfort to be felt by a driver, an occupant, or both.

Figure 1:
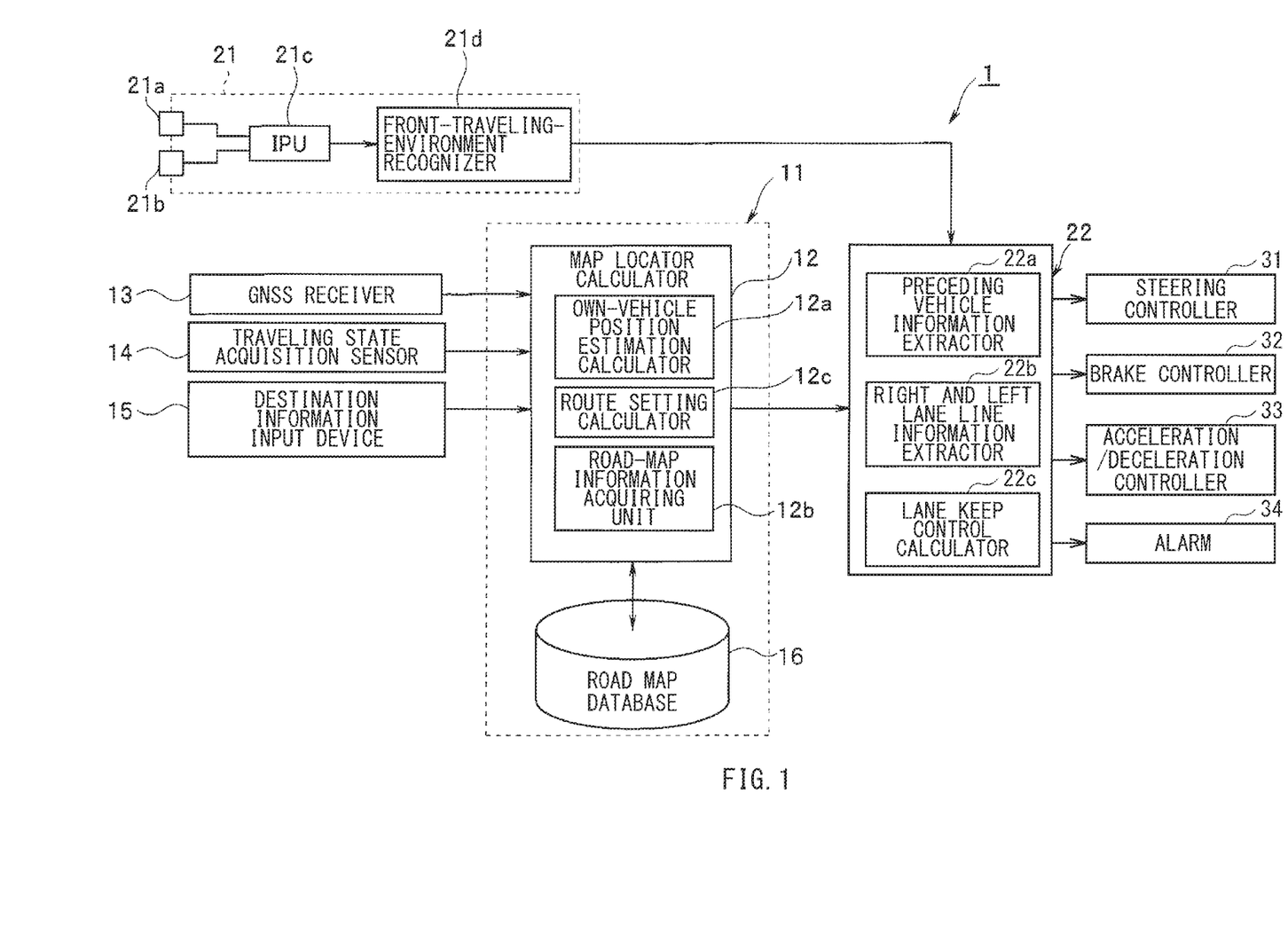
FIG. 1 is a block diagram schematically illustrating an example configuration of a driving assist system (a lane keep control apparatus) that includes an active lane keep control according to one example embodiment of the technology.
Figure 7:
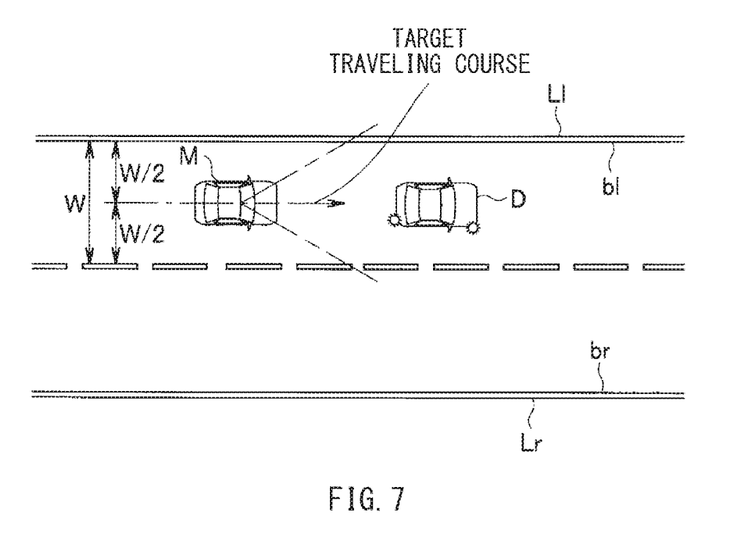
FIG. 7 is an explanatory diagram illustrating a state in which a preceding vehicle, traveling a straight road, attempts to make a lane change.
Figure 8:
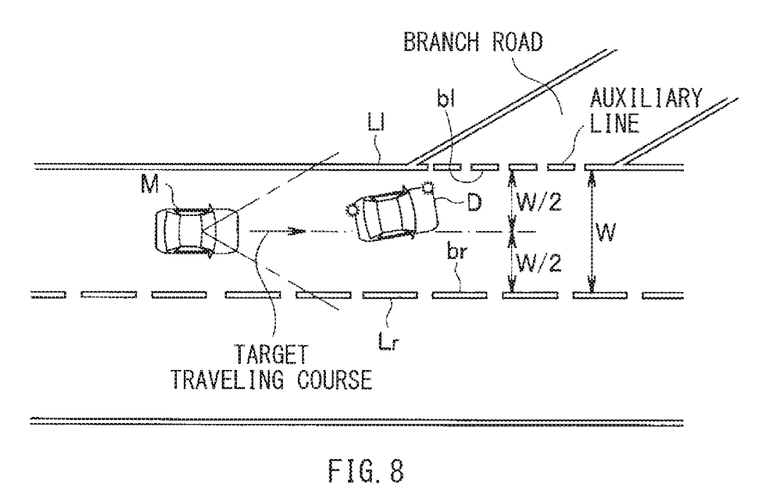
FIG. 8 is an explanatory diagram illustrating a state in which the preceding vehicle attempts to make a course change to a branch road in which an auxiliary line is drawn at its entrance.
Figure 11:
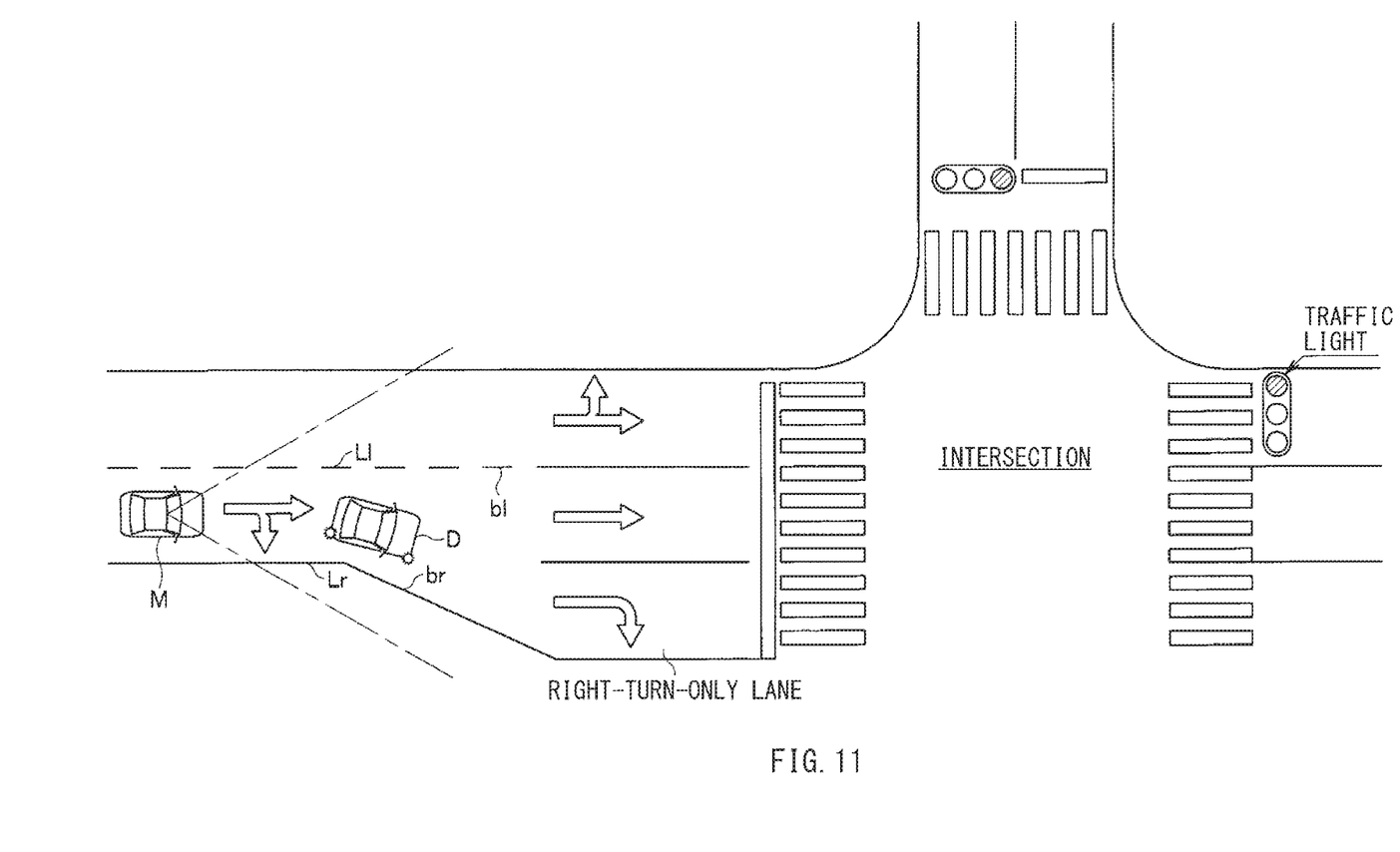
FIG. 11 is an explanatory diagram illustrating a state in which the preceding vehicle attempts to make a lane change to a right-turn-only lane positioned before an intersection by blinking the blinker of the preceding vehicle.

Referring to FIG. 1, a driving assist system (a lane keep control apparatus) 1 illustrated in FIG. 1 may be mounted on an own vehicle M illustrated in FIGS. 7, 8, and 11. The driving assist system 1 includes a camera unit 21 and a lane keep controller 22. The driving assist system 1 may include a navigation unit 11. The navigation unit 11 may set a current position of the own vehicle M, or an "own vehicle position". The navigation unit 11 may also set a running route to a destination set by a driver. In one embodiment, the camera unit 21 may serve as a "traveling environment information acquiring unit", an "acquiring unit", or a "detector".

The navigation unit 11 may estimate the own vehicle position on a road map, and may set, on the basis of road map data, the running route to the destination set by the driver. The camera unit 21 acquires information on a traveling environment ahead of the own vehicle M, and may recognize various pieces of information. Non-limiting examples of the information may be directed to: lane lines that define right and left of a traveling lane; a road shape; and the presence of a preceding vehicle. Further, the camera unit 21 may determine a middle of the lane on the basis of a distance between the right and the left lane lines, i.e., on the basis of a lane width. The camera unit 21 may also determine: a road curvature of the middle of the lane, an intervehicle distance between the own vehicle M and the preceding vehicle; a relative speed between the own vehicle M and the preceding vehicle; and any other factor obtained on the basis of the traveling environment information.

The navigation unit 11 may include a map locator calculator 12 and a road map database 16. In one embodiment, the map locator calculator 12 may serve as a "map locator calculator". In one embodiment, the road map database 16 may serve as a "storage". The road map database 16 may be stored in a storage medium such as, but not limited to, a hard disk drive (HDD).

The map locator calculator 12, a front-traveling-environment recognizer 21d to be described later, and the lane keep controller 22 each may include a known microcomputer and a peripheral device. For example, the microcomputer may include a central processing unit (CPU), a random-access memory (RAM), and a read-only memory (ROM). The ROM may store in advance a program to be executed by the CPU and a base map or other fixed data, for example.

The map locator calculator 12 may have an input coupled to a global navigation satellite system (GNSS) receiver 13, a traveling state acquisition sensor 14, and a destination information input device 15. The GNSS receiver 13 may receive positioning signals transmitted from a plurality of positioning satellites. The traveling state acquisition sensor 14 may acquire any information that allows for estimation of the own vehicle position, under an environment, such as a region in a tunnel, where the own vehicle M has difficulty in receiving positioning signals effectively from the GNSS satellites due to decreased sensitivity of the GNSS receiver 13 with respect to the GNSS satellites. The traveling state acquisition sensor 14 may include a vehicle speed sensor, a gyroscope sensor, a forward/backward acceleration sensor, and/or any other sensor that allows for the estimation of the own vehicle position.

The map locator calculator 12 may determine a travel distance and an orientation of the own vehicle M on the basis of a vehicle speed of the own vehicle M detected by the vehicle speed sensor, an angular speed detected by the gyroscope sensor, and a forward or a backward acceleration rate detected by the forward/backward acceleration sensor. On the basis of the travel distance and the orientation, the map locator calculator 12 may perform localization of the own vehicle M, under the traveling environment that involves the decreased sensitivity of the GNSS receiver 13 with respect to the GNSS satellites.

When an operator or the driver of the own vehicle M inputs information on a destination or selects the destination from a registered list appearing on a display, the destination information input device 15 may acquire a positional coordinate (e.g., a latitude and a longitude) corresponding to the destination, and may set the positional coordinate as the destination. Non-limiting examples of the destination information may include an address and a telephone number of the destination.

The map locator calculator 12 may include an own-vehicle position estimation calculator 12a, a road-map information acquiring unit 12b, and a route setting calculator 12c. The own-vehicle position estimation calculator 12a may acquire position information of the own vehicle M that indicates the positional coordinate (e.g., a latitude and a longitude) of the own vehicle M, on the basis of the positioning signals received at the GNSS receiver 13. The own-vehicle position estimation calculator 12a may estimate the positional coordinate of the own vehicle M on the basis of a signal obtained from the traveling state acquisition sensor 14, under the environment where the own vehicle M has difficulty in receiving the valid positioning signals from the GNSS satellites due to the decreased sensitivity of the GNSS receiver 13.

The road-map information acquiring unit 12b may perform, on the road map stored in the road map database 16, map matching of the positional coordinate of the own vehicle M and the positional coordinate (e.g., the latitude and the longitude) of the destination set by the destination information input device 15. The road-map information acquiring unit 12b may thereby identify the position of the own vehicle M and the position of the destination, and transmit, to the route setting calculator 12c, road map information related to the road map from the current position of the own vehicle M to a region around the destination.

The route setting calculator 12c may create, on the road map, a running route that connects the current position of the own vehicle M and the position of the destination that are identified through the map matching by the road-map information acquiring unit 12b. The route setting calculator 12c may create the running route on the basis of a preset condition, such as a recommended route or a fastest route.

The camera unit 21 may be fixed at an upper middle region, located at a front part, in the interior of the own vehicle M. The camera unit 21 may include a vehicle-mounted camera, an image processor (IPU) 21c, and a front-traveling-environment recognizer 21d. The vehicle-mounted camera may be a stereo camera that includes a main camera 21a and a subsidiary camera 21b that are disposed at respective positions bilaterally symmetric to each other about a line extending through a middle of the width of the own vehicle M. The camera unit 21 may cause the main camera 21a to perform imaging to thereby obtain reference image data, and cause the subsidiary camera 21b to perform imaging to thereby obtain comparison image data.

Thereafter, the camera unit 21 may cause the IPU 21c to perform a predetermined image process on the reference image data and the comparison image data. The front-traveling-environment recognizer 21d may read the reference image data and the comparison image data that have been subjected to the image processing at the IPU 21c, and may recognize, on the basis of a parallax between the reference image data and the comparison image data, an identical target present in both of images derived from those reference image data and comparison image data. Further, the front-traveling-environment recognizer 21d may calculate a distance from the own vehicle M to the recognized target to thereby obtain distance data, on the basis of principle of triangulation. Through recognizing the target and obtaining the distance data, the front-traveling-environment recognizer 21d may acquire front-traveling-environment information. Non-limiting examples of the front-traveling-environment information acquired by the front-traveling-environment recognizer 21d may include: data on a road shape of the traveling lane along which the own vehicle M travels; data on an intersection; data on a crosswalk; data on traffic signals; data on road signs; and data on roadside obstacles. Non-limiting examples of the data on the road shape may include: data on lane lines that define right and left; data on a road curvature [1/m] of the middle of the lane lines; and the width between the right and the left lane lines, or the lane width. Non-limiting examples of the roadside obstacle may include: a power pole; a telephone pole; a guardrail; a wall; a fence; and a parked vehicle.

Figure 5:
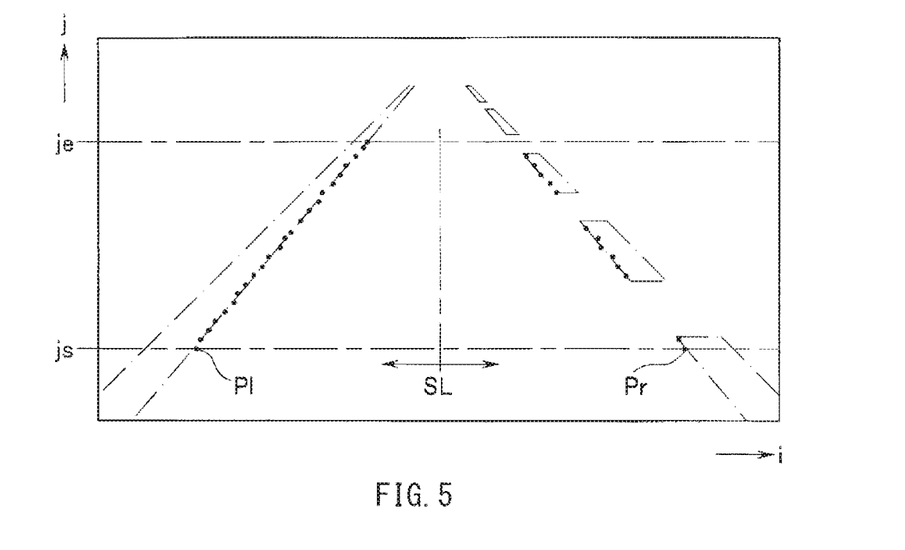
FIG. 5 is an explanatory diagram illustrating a line of proposed points of each lane line plotted on a frame image.

FIG. 5 illustrates an example of determining the right and the left lane lines each serving as one of the front-traveling-environment information. In one example, first, pixels may be sequentially searched on one horizontal line basis on the reference image data belonging to a currently-captured one frame image. The pixels may be searched in a search region that extends from a preset search-starting horizontal line js to a search-ending horizontal line je. The searching of the pixels may be performed while shifting, on one pixel-width basis or on a preset number of pixel-width basis, the pixels from the search-starting horizontal line js positioned on the lower side (i.e., positioned on the near side of the own vehicle M) to the search-ending horizontal line je positioned on the upper side (i.e., positioned on the far side of the own vehicle M). Further, on the basis of pixels values of the respective pixels in the reference image data, pixels, in which luminance derivative values of the respective pixels so vary greatly that the luminance derivative values are equal to or greater than a threshold value, are detected as being inner-side lane line boundaries. In other words, on the basis of pixels values of the respective pixels in the reference image data, the pixels, in which edge intensities (a luminance difference) so vary greatly that the edge intensities are equal to or greater than a threshold value, are detected as being the inner-side lane line boundaries.

Accordingly, in the above example, proposed points Pr and Pl that represent respective lane line boundaries br and bl may be plotted at inner edges of respective lane lines Lr and Ll. The lane lines Lr and Ll may define the right and the left of the traveling lane as illustrated in FIGS. 7, 8, and 11. Note that a reference signs "i" and "j" in FIG. 5 respectively denote the number of horizontal pixels and the number of vertical pixels. A process of the detection performed for one horizontal line may be carried out on one-pixel basis from a middle SL of the image toward each of the right lane line Lr and the left lane line Ll.

In addition, in the above example, a method such as a least-square method may be applied to a line of proposed points, arranged in time series, of each of the proposed points Pr and Pl to thereby determine a straight-line-approximating expression or a curve-approximating expression that is equal to or higher than the first order. On the basis of the approximating expression, the lane line boundaries br and bl may be set to respective inner sides of the right and the left lane lines Lr and Ll. Note that distance information of a three-dimensional object, such as a preceding vehicle D, may be calculated on the basis of the principle of triangulation s described above, and a shape of the three-dimensional object may be recognized by a known method such as a pattern matching.

The lane keep controller 22 sets the target traveling course on the basis of the front-traveling-environment information acquired by the recognition performed by the front-traveling-environment recognizer 21*d*. The target traveling course causes the own vehicle M to travel along a predetermined lateral position between the right lane line Lr and the left lane line Ll. In an example embodiment, the predetermined lateral position may be the middle of the right and the left lane lines Lr and Ll. The lane keep controller 22 includes a preceding vehicle information extractor 22*a*, a right and left lane line information extractor 22*b*, and a lane keep control calculator 22*c*. In one embodiment, the preceding vehicle information extractor 22*a* may serve as a "preceding vehicle information extractor" or a "first extractor". In one embodiment, the right and left lane line information extractor 22*b* may serve as a "lane line information extractor" or a "second extractor". In one embodiment, the lane keep control calculator 22*c* may serve as a "lane keep control calculator" or a "first calculator". The lane keep controller 22 may have an input coupled to the map locator calculator 12 and the front-traveling-environment recognizer 21*d* of the camera unit 21.

The lane keep controller 22 may have an output coupled to a steering controller 31, a brake controller 32, an acceleration/deceleration controller 33, and an alarm 34. The steering controller 31 may cause the own vehicle M to travel along the target traveling course. The brake controller 32 may decelerate or stop the own vehicle M by forcible braking. The acceleration/deceleration controller 33 may control a vehicle speed of the own vehicle M.

The preceding vehicle information extractor 22*a* extracts, from the front-traveling-environment information, information related to the preceding vehicle D that travels in front of the own vehicle M as preceding vehicle information. Non-limiting examples of the preceding vehicle information may include information on an intervehicle distance d1 and a blinking a blinker. The right and left lane line information extractor 22*b* extracts, from the front-traveling-environment information, information related to the right lane line Lr and the left lane line Ll, including the lane line boundaries br and bl, that are positioned ahead of the own vehicle M.

The lane keep control calculator 22*c* may read the preceding vehicle information, and may read the information related to the right lane line Lr and the left lane line Ll that includes the lane line boundaries br and bl. The lane keep control calculator 22*c* calculates a lane width W on the basis of a distance between the right and the left lane line boundaries br and bl. Further, in an example embodiment, the lane keep control calculator 22*c* may set the target traveling course to the middle (W/2) of the lane width W as the predetermined lateral position. The steering controller 31 may read the thus-set target traveling course, and may perform an active lane keep (ALK) control that causes the own vehicle M to travel along the target traveling course.

Figure 2:
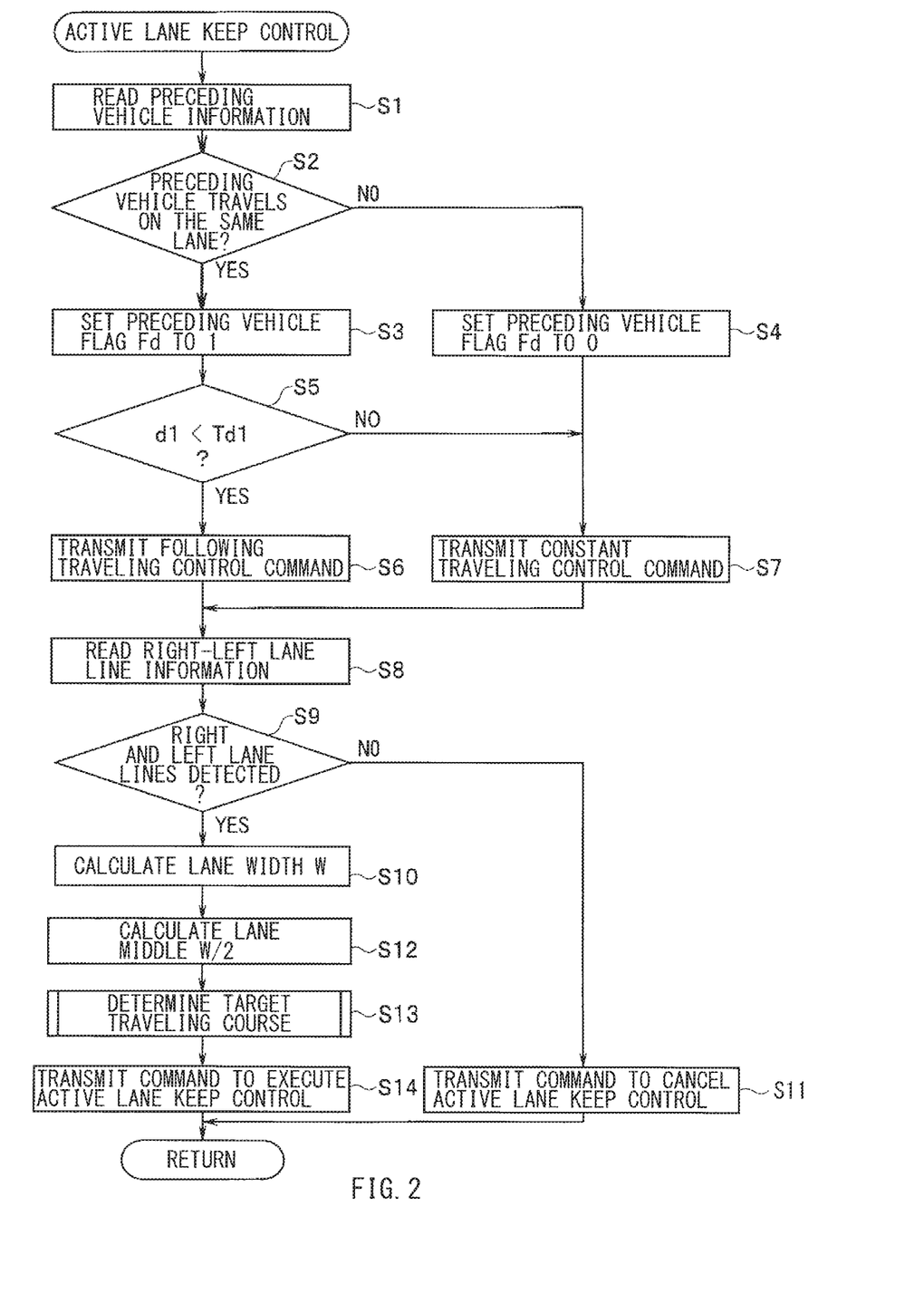
FIG. 2 is a flowchart illustrating an example routine related to the active lane keep control.

The lane keep control calculator 22*c* may perform the active lane keep control in accordance with an active lane keep control routine illustrated by way of example in FIG. 2.

Upon the active lane keep control routine, at step S1, the lane keep control calculator 22*c* may first read the preceding vehicle information extracted by the preceding vehicle information extractor 22*a*. Thereafter, at step S2, the lane keep control calculator 22*c* checks whether the preceding vehicle D travels on a lane same as the lane on which the own vehicle M travels. In one embodiment, the lane keep control calculator 22*c* that performs the process at step S2 may serve as a "preceding vehicle detector" or a "first determiner".

If the lane keep control calculator 22*c* determines that the preceding vehicle D travels on the same lane (step S2: YES), the flow may proceed to step S3. At step S3, the lane keep control calculator 22*c* may set a preceding vehicle flag Fd to one (Fd: 1), following which the flow may proceed to step S5. If the lane keep control calculator 22*c* determines that the preceding vehicle D does not travel on the same lane, i.e., the preceding vehicle D is not detected (step S2: NO), the flow may proceed to step S4. At step S4, the lane keep control calculator 22*c* may clear the preceding vehicle flag Fd (Fd: 0), following which the flow may proceed to step S7.

At step S5, the lane keep control calculator 22*c* may compare the intervehicle distance d1 and a following intervehicle distance Td1. The intervehicle distance d1 may be a distance between the own vehicle M and the preceding vehicle D. The following intervehicle distance Td1 may be set by the driver. In an alternative example embodiment, however, the following intervehicle distance Td1 may be based on a variable value set automatically in accordance with the vehicle speed.

If the lane keep control calculator 22*c* determines that the intervehicle distance d1 is less than the following intervehicle distance Td1, or d1<Td1 (step S5: YES), the flow may proceed to step S6. If the lane keep control calculator 22*c* determines that the intervehicle distance d1 is equal to or greater than the following intervehicle distance Td1, or d1≥Td1 (step S5: NO), the flow may proceed to step S7. At step S6, the lane keep control calculator 22*c* may transmit a following traveling control command to an unillustrated adaptive cruise control (ACC) unit. By transmitting the following traveling control command, the ACC unit may cause the own vehicle M to travel in such a manner as to follow the preceding vehicle D while keeping the following intervehicle distance Td1 between the own vehicle M and the preceding vehicle D. In accordance with the following traveling control command, the ACC unit may control and operate the brake controller 32 and the acceleration/deceleration controller 33 in a predetermined fashion to thereby perform a known ACC control. After step S6, the flow may proceed to step S8.

When the flow proceeds to step S7 from step S4 or from step S5, the lane keep control calculator 22c may transmit, to the ACC unit, a constant traveling control command that is based on a set vehicle speed set by the driver. By transmitting the constant traveling control command, the ACC unit may cause the own vehicle M to travel at a constant speed that is based on the set vehicle speed. In accordance with the constant traveling control command, the ACC unit may execute a traveling control that causes the own vehicle M to travel at the constant speed based on the set vehicle speed. After step S7, the flow may proceed to step S8.

When the flow proceeds to step S8 from step S6 or from step S7, the lane keep control calculator 22c may read the right-left lane line information extracted by the right and left lane line information extractor 22b, following which the flow may proceed to step S9. At step S9, the lane keep control calculator 22c may check whether the right and the left lane lines Lr and Ll are detected. If the lane keep control calculator 22c determines that the right and the left lane lines Lr and Ll are detected (step S9: YES), the flow may proceed to step S10. If the lane keep control calculator 22c determines that one or both of the right and the left lane lines Lr and Ll are discontinued, i.e., one or both of the right and the left lane lines are not detected (step S9: NO), the flow may proceed to step S11. For example, one or both of the right and the left lane lines Lr and Ll may be discontinued when the own vehicle M enters an intersection. At step S11, the lane keep control calculator 22c may transmit, to the steering controller 31, a command that cancels the active lane keep control, following which the flow may exit the active lane keep control routine. The steering controller 31 may cancel the active lane keep (ALK) control in response to the cancel command signal received from the lane keep control calculator 22c.

At step S10, the lane keep control calculator 22c may calculate the distance between the right and the left lane line boundaries br and bl, i.e., may calculate the lane width W. The right and the left lane line boundaries br and bl may be included as one of the right-left lane line information. After calculating the lane width W at step S10, the flow may proceed to step S12. At step S12, the lane keep control calculator 22c may calculate the middle W/2 of the lane from the lane width W, following which the flow may proceed to step S13.

At step S13, the lane keep control calculator 22c may determine the target traveling course that causes the own vehicle M to travel along the middle W/2 of the lane, following which the flow may proceed to step S14. A process of calculating the target traveling course performed at the step S13 may be executed in accordance with an example subroutine related to the target traveling course calculating process illustrated in FIGS. 3 and 4.

Figure 3:
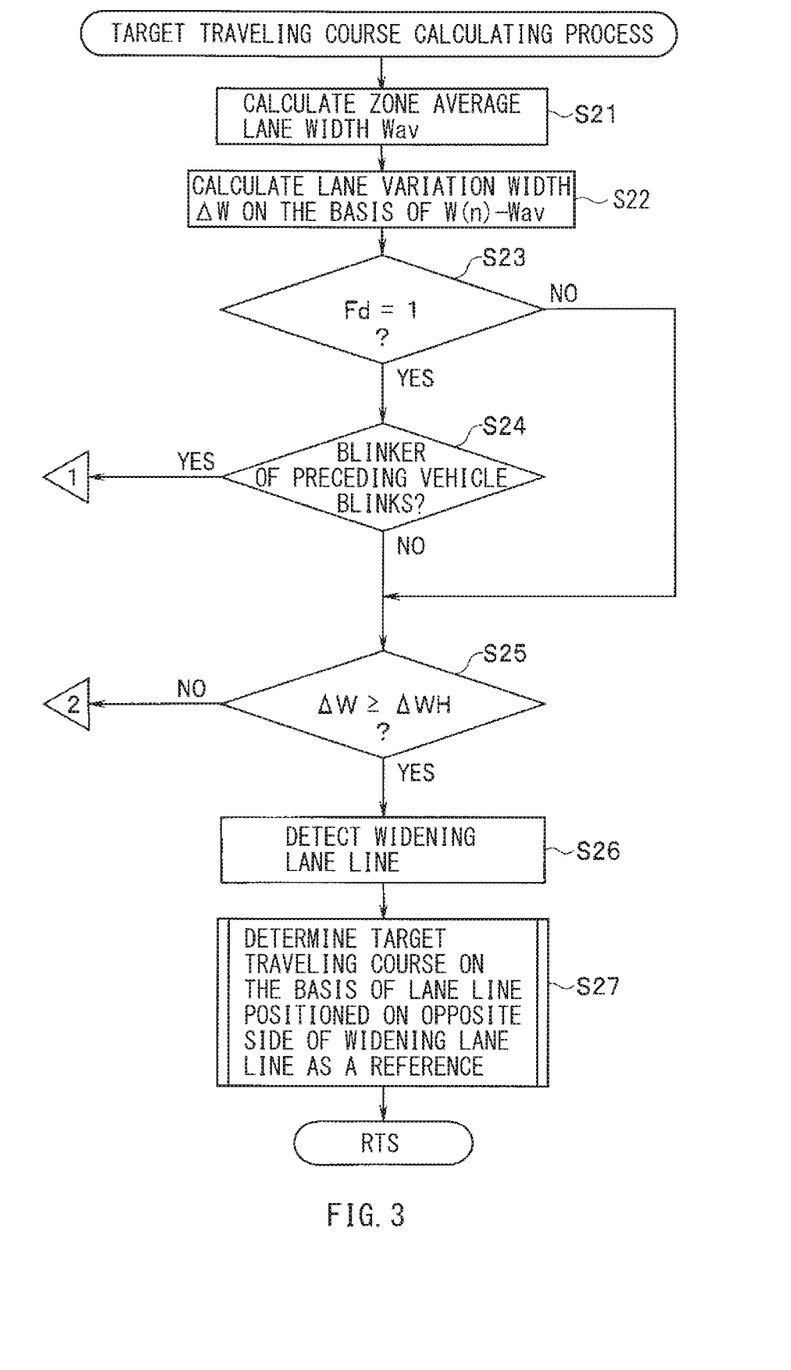
FIG. 3 is a first flowchart illustrating an example subroutine related to a process of calculating a target traveling course.

Upon the target traveling course calculating process, first, the lane keep control calculator 22c may calculate a zone average lane width Wav at step S21. The zone average lane width Wav may be determined from an average of the lane widths that belong to the plurality of past frames. The lane width of such widths may be calculated for each frame image as illustrated by way of example in FIG. 5. After calculating the zone average lane width Wav at step S21, the flow may proceed to step S22.

At step S22, the lane keep control calculator 22c may calculate a lane variation width $\Delta W$, on the basis of a difference between a currently-measured lane width W(n) and the zone average lane width Wav ($\Delta W$: W(n)−Wav). After calculating the lane variation width $\Delta W$, the flow may proceed to step S23 at which the lane keep control calculator 22c may refer to the value of the preceding vehicle flag Fd. If the lane keep control calculator 22c determines that the preceding vehicle flag Fd is set to 1 (Fd=1), i.e., the preceding vehicle D travels on the same lane (step S23: YES), the flow may proceed to step S24. If the lane keep control calculator 22c determines that the preceding vehicle flag Fd is set to 0 (Fd=0), i.e., the preceding vehicle D does not travel on the same lane (step S23: NO), the flow may proceed to step S25.

At step S24, the lane keep control calculator 22c checks, on the basis of the front-traveling-environment information, whether the blinker of the preceding vehicle D blinks. If the lane keep control calculator 22c determines that the blinker of the preceding vehicle D does not blink (step S24: NO), the flow may proceed to step S25. If the lane keep control calculator 22c determines that the blinker of the preceding vehicle D blinks (step S24: YES), the flow may proceed to step S28. In one embodiment, the lane keep control calculator 22c that performs the process at step S24 may serve as a "blinker blinking determiner" or a "second determiner".

When the flow proceeds to step S25 from step S23 or from step S24, the lane keep control calculator 22c may compare the lane variation width $\Delta W$ with a preset first widening determination threshold $\Delta WH$. If the lane keep control calculator 22c determines that the lane variation width $\Delta W$ is equal to or greater than the first widening determination threshold $\Delta WH$, or $\Delta W \geq \Delta WH$ (step S25: YES), the flow may proceed to step S26. If the lane keep control calculator 22c determines that the lane variation width $\Delta W$ is less than the first widening determination threshold $\Delta WH$, or $\Delta W < \Delta WH$ (step S25: NO), the flow may proceed to step S31. The first widening determination threshold $\Delta WH$ may be a value used to check whether a branch road is coupled to the target traveling course, and may be set in advance on the basis of a simulation or an experiment, for example. The lane width W may be calculated on the basis of the distance between the right and the left lane line boundaries br and bl.

In this case, referring to FIG. 9, the left lane line Ll extends toward the branch road if the branch road is coupled to the left lane along which the own vehicle M travels, for example. This means that the left lane line Ll widens outwardly, causing the lane width W to be detected as being widened accordingly.

Referring to FIG. 7, on a straight road, the middle W/2 of the lane width W may be set as the target traveling course in an example embodiment, meaning that the lane width W is detected as being widened when one of the lane lines (the left lane line Ll in an example illustrated in FIG. 9) extends along the branch road. This causes the middle W/2 of the lane to be set in a biased fashion toward the branch-road side and can impair traveling stability. To address this, the lane keep control calculator 22c may determine the lane as being branched in a case in which the lane variation width $\Delta W$ exceeds the first widening determination threshold $\Delta WH$, following which the flow may proceed to step S26.

At step S26, the lane keep control calculator 22c may check which of the right lane line Lr and the left lane line Ll widens. In an example case of the straight road, the proposed points Pr and Pl shift toward the middle when those proposed points Pr and Pl are searched from the search-starting horizontal line js to the search-ending horizontal line je as illustrated in FIG. 5. However, in such an example case, the proposed points Pl shifts outwardly when the left lane line Ll is drawn along the branch road. Hence, as one of example techniques to detect the widening lane line, an example embodiment may determine that a line of proposed points, arranged in time series, as the widening lane line when the line of proposed points widens toward the outer side.

The flow may proceed to step S27 after detecting the widening lane line at step S26. At step S27, the lane keep control calculator 22c may calculate the target traveling course, on the basis of the lane line (or the lane line boundary) that is positioned on the opposite side of the widening lane line as a reference. After calculating the target traveling course, the flow may proceed to step S14 of FIG. 2. In an example embodiment, as the target traveling course, the middle W/2 of the lane determined at step S12 may be set on the basis of, as a reference, the lane line boundary of the lane line that is positioned on the opposite side of the widening lane line (i.e., the right lane line boundary br of the right lane line Lr in an example illustrated in FIG. 9). In an alternative example embodiment, however, the half (½) of the zone average lane width Wav calculated at step S21 may be set as the middle of the lane.

When the flow proceeds to step S28 after the lane keep control calculator 22c has determines at step S24 that the blinker of the preceding vehicle D blinks (step S24: YES), the lane keep control calculator 22c may check, at step S28, whether the branch road is coupled to the target traveling course ahead of the own vehicle M. Note that the branch road as used herein is not limited to a road that is coupled to a main road as illustrated in FIGS. 8 and 9, but also encompasses any other type of road, such as a right-turn-only lane positioned before an intersection as illustrated in FIG. 11.

In an example embodiment, the lane keep control calculator 22c may determine whether the branch road is present on the basis of the road map information. For example, the road map information may be directed to a region ahead of the own vehicle M and may be acquired by the road-map information acquiring unit 12b of the map locator calculator 12. Note that FIG. 11 illustrates an example of a roadway where a driver keeps to the left side. For a roadway where a driver keeps to the right side, the right-turn-only lane described above is directed to and read as a left-turn-only lane.

Figure 4:
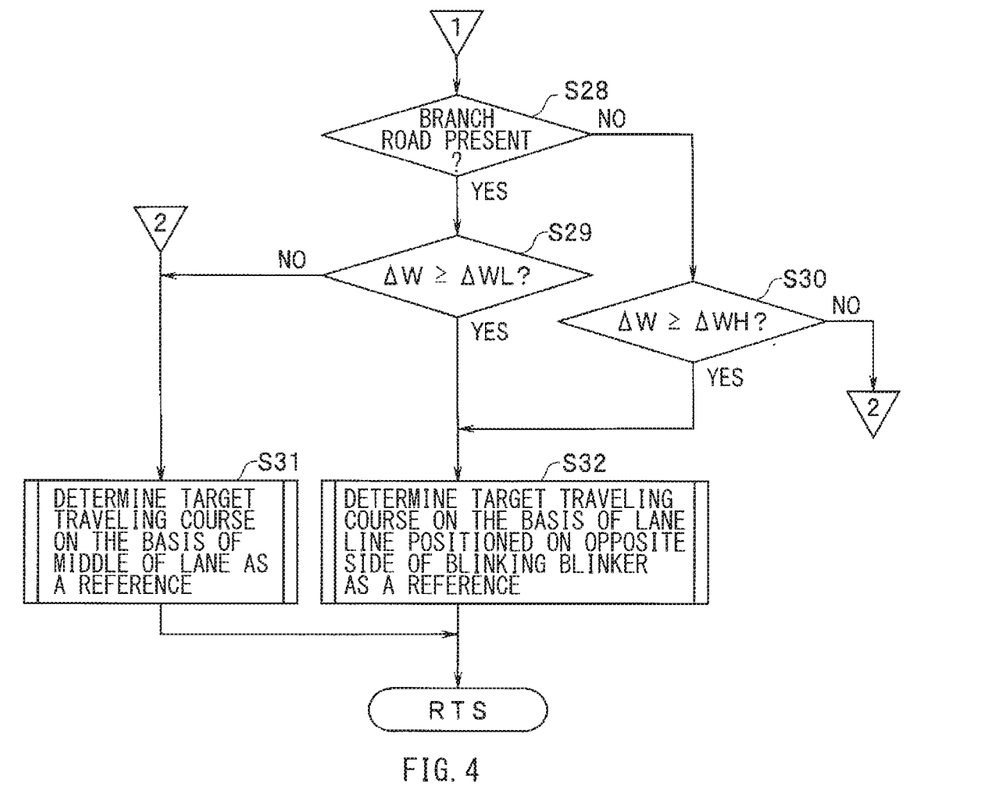
FIG. 4 is a second flowchart illustrating an example subroutine related to the target traveling course calculating process.

If the lane keep control calculator 22c determines that the branch road is present, i.e., coupled to the target traveling course ahead of the own vehicle M (step S28: YES), the flow may proceed to step S29. If the lane keep control calculator 22c determines that the branch road is not present, i.e., not coupled to the target traveling course ahead of the own vehicle M (step S28: NO), the flow may proceed to step S30. In the present example embodiment, the branch road ahead of the own vehicle M is predictable on the basis of the blinking of the blinker of the preceding vehicle D. Thus, it is sufficient to acquire information on the presence or absence of the branch road from the road map information. Hence, for example, it is possible to apply any embodiment of the technology to a case in which an accuracy is low of the road map data stored in the road map database 16 and precise displaying of a location of the branch road is difficult (or not possible) accordingly.

At step S29, the lane keep control calculator 22c may compare the lane variation width ΔW with a second widening determination threshold ΔWL. If the lane keep control calculator 22c determines that the lane variation width ΔW is less than the second widening determination threshold ΔWL, or ΔW<ΔWL (step S29: NO), the flow may proceed to step S31. If the lane keep control calculator 22c determines that the lane variation width ΔW is equal to or greater than the second widening determination threshold ΔWL, or ΔW≥ΔWL (step S29: YES), the flow may proceed to step S32. This configuration makes it possible to detect the branch road rapidly and to prevent the target traveling course from being biased toward the branch-road side. Hence, it is possible to achieve improved traveling stability.

At step S30, the lane keep control calculator 22c may compare the lane variation width ΔW with the first widening determination threshold ΔWH. If the lane keep control calculator 22c determines that the lane variation width ΔW is less than the first widening determination threshold ΔWH, or ΔW<ΔWH (step S30: NO), the flow may proceed to step S31. If the lane keep control calculator 22c determines that the lane variation width ΔW is equal to or greater than the first widening determination threshold ΔWH, or ΔW≥ΔWH (step S30: YES), the flow may proceed to step S32.

It is to be noted that the preceding vehicle D can be determined as having no intention of at least making a turn even when the blinker of the preceding vehicle D is detected, in a case in which the branch road is undetected. In such a case, for example, the preceding vehicle D can be determined as attempting to stop at a road shoulder, attempting to make a lane change, or attempting to do any other action that may not be considered as making a turn. In the case in which the blinker of the preceding vehicle D is detected but the branch road is undetected, the first widening determination threshold ΔWH that is higher than the second widening determination threshold ΔWL may be applied. Thus, it is possible to prevent the traveling stability from being impaired attributed to excessive responsiveness. In one embodiment, the lane keep control calculator 22c that performs the processes at steps S25, S29, and S30 may serve as a "lane line widening detector" or a "third determiner".

When the flow proceeds to step S31 from step S29 or from step S30, the lane keep control calculator 22c may determine the target traveling course. The target traveling course here may be based on, as a reference, the middle W/2 of the lane width W that is calculated on the basis of the distance between the right lane line boundary br and the left lane line boundary bl. After determining the target traveling course, the flow may proceed to step S14 of FIG. 2. Referring to FIG. 8, in an example case in which an auxiliary line is drawn at a connection at which the main road and the branch road are coupled, the left lane line boundary bl is still set along the inner side of the auxiliary line even when the preceding vehicle D blinks its blinker to make a course change toward the branch road, whereby the lane variation width ΔW is less than the second widening determination threshold ΔWL (ΔW<ΔWL). Accordingly, the middle W/2 of the lane may be set as the target traveling course on the basis of the lane width W between the right lane line boundary br and the left lane line boundary bl.

When the flow proceeds to step S32 from step S29 or from step S30, the lane keep control calculator 22c sets the target traveling course. The target traveling course here is based on, as a reference, the lane line (or the lane line boundary) that is positioned on the opposite side of the blinking blinker of the preceding vehicle D. After setting the target traveling course, the flow may proceed to step S14 of FIG. 2. In one embodiment, the lane keep control calculator 22c that performs the process at step S32 may serve as a "target traveling course calculator" or a "second calculator".

The middle of the lane in the above example cases may be based on the value (e.g., W/2) calculated at step S12, or may be based on the half (½) of the zone average lane width Wav calculated at step S21. In an alternative example embodiment, the middle of the lane may be ½ of the latest lane width W(n).

For example, a control delay can occur if the widening lane line is first detected as in the process at step S26 and the lane line, to serve as a reference, is identified thereafter, in a case in which no preceding vehicle D travels on the target traveling course of the own vehicle M. In contrast, detecting the blinking of the blinker of the preceding vehicle D makes it possible to identify the lane line to serve as a reference immediately, and prevent the control delay accordingly.

Figure 6:
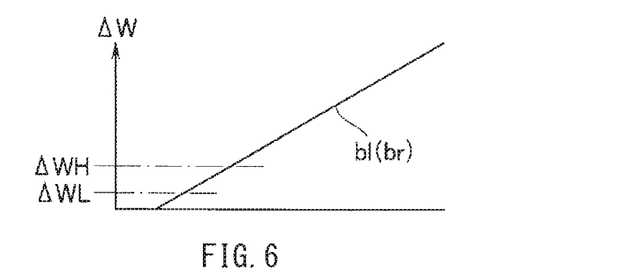
FIG. 6 is an explanatory diagram illustrating a threshold for determining widening of a lane width.

In addition, the second widening determination threshold ΔWL may be so set as to be lower in value than the first widening determination threshold ΔWH as illustrated in FIG. 6. This configuration makes it possible to detect the discontinuation of the lane line promptly without causing erroneous determination, even in a case in which the lane line is discontinued. For example, the discontinuation of the lane line occurs when the auxiliary line is not drawn at the connection at which the main road and the branch road are coupled, or when the auxiliary line or the lane line is faded. In such a case in which the lane line is discontinued, the blinking of the blinker of the preceding D is detected, following which the lane variation width ΔW at the branch road is detected as exceeding the second widening determination threshold ΔWL. As illustrated in FIG. 10, the lane variation width ΔW may be the difference between the lane width W(n) at the at the branch road and the zone average lane width Wav. By detecting that the lane variation width ΔW exceeds the second widening determination threshold ΔWL in this way, it is possible to detect the discontinuation of the lane line promptly without causing erroneous determination.

The same holds true for the right-turn-only lane illustrated by way of example in FIG. 11 as well. For example, even in a case in which: the right-turn-only lane is present ahead of the target traveling course as the branch road; and the lane line is discontinued at the connection at which the main road and the right-turn-only lane are coupled, the middle of the lane is set as the target traveling course promptly on the basis of, as a reference, the left lane line boundary bl that is set along the inner side of the left lane line Ll, when the lane variation width ΔW becomes equal to or greater than the second widening determination threshold ΔWL (ΔW≥ΔWL).

Thereafter, at step S14 of FIG. 2, the lane keep control calculator 22c may transmit, to the steering controller 31, a command signal that allows the active lane keep control to be executed, following which the flow may exit the active lane keep control routine. The active lane keep control may cause the own vehicle M to travel along the target traveling course set at step S13. The steering controller 31 may execute the active lane keep (ALK) control to thereby cause the own vehicle M to travel along the target traveling course calculated by the lane keep control calculator 22c.

According to the foregoing example embodiment, when the lane variation width ΔW becomes equal to or greater than the second widening determination threshold ΔWL (ΔW≥ΔWL) in a case in which the preceding vehicle D blinks its blinker to make the course change toward the branch road, the connection at which the main road and the branch road are coupled is determined as being discontinued owing to the widening of the lane line even if the discontinuation occurs at the connection. Through determining that the connection involves the discontinuation, the target traveling course is set on the basis of, as a reference, the left lane line boundary bl or br that is set along the lane line positioned on the opposite side.

Thus, it is possible to prevent the target traveling course from being biased largely toward the branch road and obtain stable controllability for the active lane keep (ALK) control. Hence, it possible to reduce a sense of discomfort to be felt by a driver, an occupant, or both.

Accordingly, in some example embodiments, whether the preceding vehicle D travels on the lane same as the traveling lane on which the own vehicle M travels is checked, on the basis of the preceding vehicle information extracted by the preceding vehicle information extractor 22a. When the preceding vehicle is determined as traveling on the same traveling lane, whether the blinker of the preceding vehicle blinks is determined on the basis of the front-traveling-environment information acquired by the camera unit 21. Further, the target traveling course is set on the basis of, as a reference, one of the lane lines that is positioned on the opposite side of the other of the lane lines. The other of the lane lines is positioned on a side on which the blinker of the preceding vehicle blinks. Thus, on the basis of the widening of a lane line, it is possible to detect the discontinuation of such a lane line promptly without causing erroneous determination. Hence, it is possible to prevent the controllability for the active lane keep control from becoming unstable, and thereby to reduce a sense of discomfort to be felt by a driver, an occupant, or both.

Although some example embodiments of the technology have been described in the foregoing with reference to the accompanying drawings, the technology is by no means limited to the example embodiments described above. Various changes and modifications may be made to any embodiment without departing from the scope of the technology. The technology is intended to encompass such modifications and alterations in so far as they fall within the scope of the appended claims or the equivalents thereof.

For example, the target traveling course may be set in the middle W/2 of the lane width W in the foregoing example embodiment. In an alternative example embodiment, however, the target traveling course may be set at a position that is biased toward one side of the lane width W. The embodiment described above explains an example of the lane keep control apparatus in a case where the subject vehicle travels on a road where drivers keep to the left by law. Needless to say, if the lane keep control apparatus is to be applied to a road where drivers keep to the right by law, left and right settings or the like may be appropriately set in an opposite manner.

The lane keep controller 22 and/or the lane keep control calculator 22c illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the lane keep controller 22 and/or the lane keep control calculator 22c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the lane keep controller 22 and/or the lane keep control calculator 22c illustrated in FIG. 1.

The invention claimed is:

1. A lane keep control apparatus comprising:
an acquiring unit configured to acquire traveling environment information that represents a traveling environment ahead of an own vehicle;
a first extractor configured to extract preceding vehicle information from the traveling environment information acquired by the acquiring unit, the preceding vehicle information being information on a preceding vehicle that travels ahead of the own vehicle;
a second extractor configured to extract lane line information from the traveling environment information acquired by the acquiring unit, the lane line information being information on a pair of lane lines that define right and left of a traveling lane along which the own vehicle travels; and
a first calculator configured to determine a lane width of the traveling lane on a basis of the lane line information extracted by the second extractor, and calculate a target traveling course, the target traveling course being configured to cause the own vehicle to travel along a predetermined lateral position in the lane width,
the first calculator including
a first determiner configured to determine whether the preceding vehicle travels on the traveling lane, on a basis of the preceding vehicle information extracted by the first extractor,
a second determiner configured to determine, when the first determiner determines that the preceding vehicle travels on the traveling lane, whether a blinker of the preceding vehicle blinks, on a basis of the traveling environment information acquired by the acquiring unit,
a third determiner configured to determine whether one of the pair of lane lines changes a direction to be away from another one of the pair of lane line so that the lane width of the traveling lane becomes wider, and
a second calculator configured to set, when the blinker of the preceding vehicle is blinking and the direction of the one of the pair of lane line is toward a direction indicated by the blinker, the target traveling course on a basis of, as a reference, only the another one of the pair of lane lines.

2. The lane keep control apparatus according to claim 1, wherein the third determiner is configured to compare an amount of variation in the lane width with a threshold, and determine that one of the pair of lane lines changes the direction to be away from another one of the pair of lane line in a case in which the amount of variation in the lane width exceeds the threshold.

3. The lane keep control apparatus according to claim 2, wherein the threshold includes a first threshold and a second threshold having a lower value that that of the first threshold,
wherein, in a case in which a branch road is detected ahead of the own vehicle on the basis of the traveling environment information acquired by the acquiring unit or on a basis of road map information, the third determiner is configured to use the second threshold,
wherein, in a case in which the branch road is undetected ahead of the own vehicle, the third determiner is configured to use the first threshold, and
wherein the road map information is information on a road map ahead of the own vehicle and obtained on a basis of information on an estimated position of the own vehicle.

4. A lane keep control apparatus comprising:
a detector configured to detect a traveling environment ahead of an own vehicle and acquire traveling environment information that represents the traveling environment; and
circuitry configured to
extract preceding vehicle information from the traveling environment information acquired by the detector, the preceding vehicle information being information on a preceding vehicle that travels ahead of the own vehicle,
extract lane line information from the traveling environment information acquired by the detector, the lane line information being information on a pair of lane lines that define right and left of a traveling lane along which the own vehicle travels,
determine a lane width of the traveling lane on a basis of the extracted lane line information,
calculate a target traveling course that is configured to cause the own vehicle to travel along a predetermined lateral position in the lane width,
determine whether the preceding vehicle travels on the traveling lane, on a basis of the extracted preceding vehicle information,
determine, when the preceding vehicle is determined as traveling on the traveling lane, whether a blinker of the preceding vehicle blinks, on a basis of the traveling environment information acquired by the detector,
determine whether one of the pair of lane lines changes a direction to be away from another one of the pair of lane line so that the lane width of the traveling lane becomes wider, and
set, when the blinker of the preceding vehicle is blinking and the direction of the one of the pair of lane line is toward a direction indicated by the blinker, the target traveling course on a basis of, as a reference, only the another one of the pair of lane lines.

* * * * *